US009973792B1

(12) United States Patent
Delachanal

(10) Patent No.: US 9,973,792 B1

(45) Date of Patent: May 15, 2018

(54) SYSTEMS AND METHODS FOR PRESENTING VISUAL INFORMATION DURING PRESENTATION OF A VIDEO SEGMENT

(71) Applicant: GOPRO, INC., San Mateo, CA (US)

(72) Inventor: Christophe Delachanal, Lumbin (FR)

(73) Assignee: GoPro, Inc., San Mateo, CA (US)

(*) Notice: Subject to any disclaimer, the term of this patent is extended or adjusted under 35 U.S.C. 154(b) by 72 days.

(21) Appl. No.: 15/336,752

(22) Filed: Oct. 27, 2016

(51) Int. Cl.

| | |
|---|---|
| ***G06F 15/16*** | (2006.01) |
| ***H04N 21/234*** | (2011.01) |
| ***H04L 29/06*** | (2006.01) |
| ***H04N 21/4223*** | (2011.01) |

(Continued)

(52) U.S. Cl.

CPC ... *H04N 21/23424* (2013.01); *G06K 9/00718* (2013.01); *G06K 9/00765* (2013.01); *H04L 65/602* (2013.01); *H04N 21/2387* (2013.01); *H04N 21/4223* (2013.01)

(58) Field of Classification Search

CPC ......... H04N 21/23424; H04N 21/2387; H04N 21/4223; G06K 9/00718; G06K 9/00765; H04L 65/602

See application file for complete search history.

(56) References Cited

U.S. PATENT DOCUMENTS

| | | | |
|---|---|---|---|
| 98,897 | A | 1/1870 | Thobu |
| 563,528 | A | 7/1896 | Willson |
| 5,432,871 | A | 7/1995 | Novik |

(Continued)

FOREIGN PATENT DOCUMENTS

| | | | |
|---|---|---|---|
| EP | 0605045 | A1 | 7/1994 |
| EP | 0650299 | A1 | 4/1995 |
| EP | 0661672 | A1 | 7/1995 |

OTHER PUBLICATIONS

Ryan Jackson: 'Shooting 360-degree video with four GoPro HD Hero cameras / Ryan Jackson Photography' 8 fvrier 2011 (Feb. 8, 2011), XP055099926, Extrait de l'Internet: URL:http://punkoryan.com/2011/02/08/shooting-360-degree-video-with-four-gopro-hd-hero-cameras [extrait le Feb. 3, 2014] 37 pages.

(Continued)

*Primary Examiner* — Jonathan A Bui

(74) *Attorney, Agent, or Firm* — Sheppard Mullin Richter & Hampton LLP

(57) ABSTRACT

A first and second video segment may be obtained. A second video segment may be obtained. A first and second set of contextual information associated with the first and second video segments may be obtained. The first set of contextual information defining a first set of performance information characterizing performance of a first activity associated with the first video segment and the second set of contextual information defining a second set of performance information characterizing performance of a second activity associated with the second video segment. The first set of performance information and the second set of performance information may be compared. Relative performance of the first activity relative to the second activity may be determined based upon the comparison. Visual information associated with the first video segment may be generated. The visual information may be presented during presentation of the first video segment.

20 Claims, 5 Drawing Sheets

200

You were faster today then you were on this same date one year ago

202

(51) Int. Cl.
*H04N 21/2387* (2011.01)
*G06K 9/00* (2006.01)

(56) References Cited

U.S. PATENT DOCUMENTS

| | | | |
|---|---|---|---|
| 6,384,862 B1 | 5/2002 | Brusewitz | |
| 6,434,265 B1 | 8/2002 | Xiong | |
| 6,486,908 B1 | 11/2002 | Chen | |
| 6,710,740 B2 | 3/2004 | Needham | |
| 6,711,293 B1 | 3/2004 | Lowe | |
| 6,788,333 B1 | 9/2004 | Uyttendaele | |
| 7,092,012 B2 | 8/2006 | Nakamura | |
| 7,403,224 B2 | 7/2008 | Fuller | |
| 7,623,176 B2 | 11/2009 | Hoshino | |
| 7,983,502 B2 | 7/2011 | Cohen | |
| 8,044,992 B2 | 10/2011 | Kurebayashi | |
| 8,411,166 B2 | 4/2013 | Miyata | |
| 8,443,398 B2 | 5/2013 | Swenson | |
| 8,606,073 B2 | 12/2013 | Woodman | |
| 8,644,702 B1 | 2/2014 | Kalajan | |
| 8,670,030 B2 | 3/2014 | Tanaka | |
| 8,842,197 B2 | 9/2014 | Singh | |
| 8,890,954 B2 | 11/2014 | O'Donnell | |
| 8,896,694 B2 | 11/2014 | O'Donnell | |
| 9,001,217 B2 | 4/2015 | Kinoshita | |
| 9,019,396 B2 | 4/2015 | Kiyoshige | |
| 9,056,676 B1 | 6/2015 | Wang | |
| 9,106,872 B2 | 8/2015 | Tsurumi | |
| 9,342,534 B2 | 5/2016 | Singh | |
| 9,412,278 B1 | 8/2016 | Gong | |
| 9,473,758 B1 | 10/2016 | Long | |
| 9,602,795 B1 | 3/2017 | Matias | |
| 2002/0112005 A1 | 8/2002 | Namias | |
| 2002/0122113 A1 | 9/2002 | Foote | |
| 2002/0191087 A1 | 12/2002 | Hashimoto | |
| 2003/0085992 A1 | 5/2003 | Arpa | |
| 2004/0021780 A1 | 2/2004 | Kogan | |
| 2004/0047606 A1 | 3/2004 | Mikawa | |
| 2004/0061667 A1 | 4/2004 | Sawano | |
| 2004/0075738 A1 | 4/2004 | Burke | |
| 2004/0135900 A1 | 7/2004 | Pyle | |
| 2004/0169724 A1 | 9/2004 | Ekpar | |
| 2004/0174434 A1 | 9/2004 | Walker | |
| 2004/0239763 A1 | 12/2004 | Notea | |
| 2005/0033760 A1 | 2/2005 | Fuller | |
| 2005/0062869 A1 | 3/2005 | Zimmermann | |
| 2005/0104976 A1 | 5/2005 | Currans | |
| 2005/0134707 A1 | 6/2005 | Perotti | |
| 2005/0289111 A1 | 12/2005 | Tribble | |
| 2006/0050997 A1 | 3/2006 | Imamura | |
| 2006/0195876 A1 | 8/2006 | Calisa | |
| 2007/0030358 A1 | 2/2007 | Aoyama | |
| 2007/0120986 A1 | 5/2007 | Nunomaki | |
| 2007/0140662 A1 | 6/2007 | Nunomaki | |
| 2007/0279494 A1 | 12/2007 | Aman | |
| 2008/0094499 A1 | 4/2008 | Ueno | |
| 2008/0118100 A1 | 5/2008 | Hayashi | |
| 2009/0118896 A1 | 5/2009 | Gustafsson | |
| 2009/0217343 A1 | 8/2009 | Bellwood | |
| 2009/0251558 A1 | 10/2009 | Park | |
| 2009/0262206 A1 | 10/2009 | Park | |
| 2010/0045773 A1 | 2/2010 | Ritchey | |
| 2010/0097443 A1 | 4/2010 | Lablans | |
| 2010/0228418 A1 | 9/2010 | Whitlow | |
| 2010/0238304 A1 | 9/2010 | Miyata | |
| 2010/0289924 A1 | 11/2010 | Koshikawa | |
| 2010/0299630 A1 | 11/2010 | McCutchen | |
| 2011/0115883 A1 | 5/2011 | Kellerman | |
| 2011/0141300 A1 | 6/2011 | Stec | |
| 2011/0261227 A1 | 10/2011 | Higaki | |
| 2011/0275045 A1* | 11/2011 | Bhupathi | G09B 19/003 434/247 |
| 2012/0098981 A1 | 4/2012 | Ip | |
| 2012/0143482 A1 | 6/2012 | Goossen | |
| 2012/0199689 A1 | 8/2012 | Burkland | |
| 2012/0199698 A1 | 8/2012 | Thomasson | |
| 2012/0206565 A1 | 8/2012 | Villmer | |
| 2012/0242798 A1 | 9/2012 | Mcardle | |
| 2013/0058619 A1 | 3/2013 | Miyakawa | |
| 2013/0127903 A1 | 5/2013 | Paris | |
| 2013/0132462 A1 | 5/2013 | Moorer | |
| 2013/0176403 A1 | 7/2013 | Varga | |
| 2013/0182177 A1 | 7/2013 | Furlan | |
| 2013/0210563 A1 | 8/2013 | Hollinger | |
| 2013/0235226 A1 | 9/2013 | Karn | |
| 2013/0314442 A1 | 11/2013 | Langlotz | |
| 2014/0037268 A1 | 2/2014 | Shoji | |
| 2014/0049652 A1 | 2/2014 | Moon | |
| 2014/0067162 A1 | 3/2014 | Paulsen | |
| 2014/0211987 A1 | 7/2014 | Fan | |
| 2014/0240122 A1 | 8/2014 | Roberts | |
| 2014/0267544 A1 | 9/2014 | Li | |
| 2014/0270480 A1 | 9/2014 | Boardman | |
| 2015/0055937 A1 | 2/2015 | Van Hoff | |
| 2015/0058102 A1 | 2/2015 | Christensen | |
| 2015/0134673 A1 | 5/2015 | Golan | |
| 2015/0186073 A1 | 7/2015 | Pacurariu | |
| 2015/0189221 A1 | 7/2015 | Nakase | |
| 2015/0287435 A1 | 10/2015 | Land | |
| 2015/0296134 A1 | 10/2015 | Cudak | |
| 2015/0341550 A1 | 11/2015 | Lay | |
| 2015/0346722 A1 | 12/2015 | Herz | |
| 2015/0362917 A1 | 12/2015 | Wang | |
| 2016/0005435 A1 | 1/2016 | Campbell | |
| 2016/0055883 A1 | 2/2016 | Soll | |
| 2016/0104284 A1 | 4/2016 | Maguire | |
| 2016/0112713 A1 | 4/2016 | Russell | |
| 2016/0117829 A1 | 4/2016 | Yoon | |
| 2016/0180197 A1 | 6/2016 | Kim | |
| 2016/0234438 A1 | 8/2016 | Satoh | |
| 2016/0239340 A1 | 8/2016 | Chauvet | |
| 2016/0269621 A1 | 9/2016 | Cho | |
| 2016/0274582 A1 | 9/2016 | Banda | |
| 2016/0292881 A1* | 10/2016 | Bose | G06K 9/00342 |
| 2016/0308813 A1 | 10/2016 | Kalajan | |
| 2016/0313732 A1 | 10/2016 | Seydoux | |
| 2016/0313734 A1 | 10/2016 | Enke | |
| 2016/0366290 A1 | 12/2016 | Hoshino | |
| 2017/0015405 A1 | 1/2017 | Chau | |
| 2017/0023939 A1 | 1/2017 | Krouse | |

OTHER PUBLICATIONS

PCT International Search Report for PCT/EP2014/061897 dated Sep. 15, 2014, 3 pages.

Mai Zheng et al: "Stitching Video from Webcams", Dec. 1, 2008 (Dec. 1, 2008), Advances in Visual Computing: 4th International Symposium, ISVC 2008, Las Vegas, NV, USA, Dec. 1-3, 2008. Proceedings, Part II, Springer Berlin Heidelberg, Berlin, Heidelberg, pp. 420-429, XP019112243, ISBN: 978-3-540-89645-6 le document en entier.

PCT International Search Report for PCT/EP2014/058008 dated May 26, 2014, 3 pages.

Foote J et al: 'FlyCam: Practical Panoramic Video and Automatic Camera Control', Multimedia and Expo, 2000. ICME 2000. 2000 IEEE International Conference on New York, NY, USA Jul. 30-Aug. 2, 2000, Piscataway, NJ, USA,IEEE, US, vol. 3, Jul. 30, 2000 (Jul. 30, 2000), pp. 1419-1422, XP010512772, DOI: 10.1109/ICME.2000.871033 ISBN: 978-0-7803-6536-0.

Hossein Afshari et al: "The Panoptic Camera: A Plenoptic Sensor with Real-Time Omnidirectional Capability", Journal of Signal Processing Systems, vol. 70, No. 3, Mar. 14, 2012 (Mar. 14, 2012), pp. 305-328, XP055092066, ISSN: 1939-8018, DOI: 10.1007/s11265-012-0668-4.

Benjamin Meyer et al: "Real-time Free-Viewpoint Navigation from Compressed Multi-Video Recordings", Proc. 3D Data Processing, Visualization and Transmission (3DPVT), May 31, 2010 (May 31, 2010), pp. 1-6, XP055091261, Extrait de l'Internet: URL:http://www.cg.cs.tu-bs.de/media/publications/meyer2010realtime.pdf [extrait le Dec. 3, 2013].

(56) References Cited

OTHER PUBLICATIONS

Lipski, C.: "Virtual video camera", SIGGRAPH '09: Posters on, SIGGRAPH '09, vol. 0, Jan. 1, 2009 (Jan. 1, 2009), pp. 1-1, XP055091257, New York, New York, USA DOI: 10.1145/1599301.1599394.

Felix Klose et al: "Stereoscopic 3D View Synthesis From Unsynchronized Multi-View Video", Proc. European Signal Processing Conference (EUSIPCO), Barcelona, Spain, Sep. 2, 2011 (Sep. 2, 2011), pp. 1904-1909, XP055091259, Extrait de l'Internet: URL:http://www.cg.cs.tu-bs.de/media/publications/eusipco2011_3d_synth.pdf [extrait le Dec. 3, 2013].

PCT International Search Report for PCT/EP2014/057352 dated Jun. 27, 2014, 3 pages.

Farin et al., "Shortest Circular Paths on Planar Graphs," In 27th Symposium on Information Theory in the Benelux 2006, 8 pgs.

Zhi et al., "Toward Dynamic Image Mosaic Generation With Robustness to Parallax," IEEE Transactions on Image Processing, vol. 21, No. 1, Jan. 2012, pp. 366-378.

Perazzi et al., "Panoramic Video from Unstructured Camera Arrays," Eurographics, vol. 34 (2015), No. 2, 12pgs.

U.S. Appl. No. 14/920,427, filed Oct. 22, 2015, entitled "Apparatus and Methods for Embedding Metadata Into Video Stream" 62 pages.

U.S. Appl. No. 14/949,786, filed Nov. 23, 2015, entitled "Apparatus and Methods for Image Alignment" 67 pages.

U.S. Appl. No. 14/927,343, filed Oct. 29, 2015, entitled "Apparatus and Methods for Rolling Shutter Compensation for Multi-Camera Systems" 45 pages.

U.S. Appl. No. 15/001,038, filed Jan. 19, 2016, entitled "Metadata Capture Apparatus and Methods" 54 pages.

* cited by examiner

200

SYSTEMS AND METHODS FOR PRESENTING VISUAL INFORMATION DURING PRESENTATION OF A VIDEO SEGMENT

FIELD

The disclosure relates to systems and methods for presenting visual information during presentation of a video segment.

BACKGROUND

Image capturing devices are used to capture images and/or videos of its surroundings. They may be used to capture special moments, sporting events, concerts, etc. Multiple videos may capture similar activities being performed, either by the same person or by different people. The videos may have been captured at the same location, date, and time, or the videos may have been captured at different dates, times, or locations.

SUMMARY

The disclosure relates to presenting visual information during presentation of a video segment, in accordance with one or more implementations. A video may include one or more activities. Presentation of the video may be augmented with information that compares the captured activity from the video with related activity from the same video or from another video. A first video segment and a second video segment may be obtained. The first video segment may include a person riding a wave. The second video segment may include the same person riding a different wave or a different person riding a wave. The activity captured within the first video and/or the second video may be associated with contextual information characterizing the activity. Characterizations of the activity may include location, date, time, speed, altitude, and/or other characterizations of the activity. The contextual information associated with the first video segment may be compared with the contextual information associated with the second video segment. The comparison may be presented as visual information during presentation of the first video segment.

In some implementations, a system configured to present visual information during presentation of a video segment may include one or more servers. The server(s) may be configured to communicate with one or more client computing platforms according to a client/server architecture. The users of the system may access the system via client computing platform(s). The server(s) may be configured to execute one or more computer program components. The computer program components may include one or more of an authentication component, a segment component, a contextual information component, a comparison component, a relative performance component, a visual information component, a presentation component, and/or other components.

The authentication component may be configured to authenticate a user associated with one or more client computing platforms accessing one or more images and/or video segments via the system. The authentication component may manage accounts associated with users and/or consumers of the system. The user accounts may include user information associated with users and/or consumers of the user accounts. User information may include information stored by the server(s), one or more client computing platforms, and/or other storage locations.

The segment component may be configured to obtain a first video segment and a second video segment. The first video segment and/or the second video segment may be available within the repository of video segments available via the system and/or available on a third party platform, which may be accessible and/or available via the system. The segment component may be configured to receive a selection of the first video segment and/or the second video segment from the user. The user may select the first video segment and/or the second video segment via a user interface associated with the system available via one or more client computing platform(s).

The contextual information component may be configured to obtain a first set of contextual information associated with the first video segment and a second set of contextual information associated with the second video segment. The sets of contextual information may include any information pertaining to an environment in which the video segments and/or portions of the video segments were captured. The sets of contextual information may include visual and/or audio information based upon the environment in which the video segments and/or portions of the video segments were captured. The first set of contextual information may define a first set of performance information characterizing performance of a first activity associated with the first video segment. The second set of contextual information may define a second set of performance information characterizing performance of a second activity associated with the second video segment. The sets of contextual information may include one or both of temporal attributes and/or spatial attributes. Temporal attributes may define a time in which the video segments and/or portions of the video segments were captured (e.g., date, time, time of year, season, etc.). Spatial attributes may define the environment in which the video segments and/or portion of the video segments were captured (e.g., location, landscape, weather, activities, etc.). The temporal attributes and/or spatial attributes may include one or more of a geolocation attribute, a time attribute, a date attribute, and/or a content attribute.

The first set of contextual information and/or the second set of contextual information may be generated from one or more of image analysis of the first video segment, image analysis of the second video segment, a wearable sensor worn by a performer within the first video segment and/or the second video segment, a wearable sensor worn by a user that captured the first video segment and/or the second video segment, one or more sensors carried by an image capturing device that captured the first video segment and/or the second video segment, movement of the image capturing device that captured the first video segment and/or the second video segment, and/or the first set of contextual information and/or the second set of contextual information may be generated in other ways. Movement of the image capturing device may be determined from one or more motion sensors and/or orientation sensors associated with the image capturing device. The one or more motion sensors and/or orientation sensors may include one or more of a global positioning system, an accelerometer, a gyroscope, a magnetometer, an inertial measurement unit, a magnetic position sensor, a radio-frequency position sensor, an altimeter, a distance measurement sensor, and/or other motion sensors and/or orientation sensors.

The comparison component may be configured to compare the first set of performance information and the second set of performance information. For example, the comparison component may be configured to compare the first set of performance information and the second set of performance information to determine that an action depicted within both the first video segment and the second video segment includes surfing.

The relative performance component may be configured to determine relative performance of the first activity relative to the second activity based upon the comparison by the comparison component. Based upon commonalities between the first set of performance information and the second set of performance information, the relative comparison component may be configured to determine differences between the first set of performance information and the second set of performance information. For example, the comparison component may have compared the first activity and the second activity to determine that both include surfing. The relative performance component may be configured to determine that the first video segment includes a girl riding a wave at the beach at a particular date and time and that the second video segment includes the same girl riding a wave at the same beach near the same time a year prior. The relative performance component may be configured to determine the relative performance of the first activity relative to the second activity based upon the comparison to include that the girl rode the wave at a slightly faster speed than a year ago.

The visual information component may be configured to generate visual information associated with the first video segment. The visual information may include the relative performance determined by the relative performance component. The visual information may include helpful information to inform the user of differences and/or similarities between the first video segment and the second video segment. The visual information may include text describing the comparison between the first set of contextual information and the second set of contextual information. The visual information may include a graphic. The visual information may include an image from the second video segment. The visual information may include a portion of and/or the entire time duration of the second video segment.

The presentation component may be configured to effectuate presentation of the visual information during presentation of the first video segment. The visual information may be presented during presentation of the first video segment at or near a tagged point in time within the time duration of the first video segment. The visual information may be presented during presentation of the first video segment throughout an entire time duration of the first video segment.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
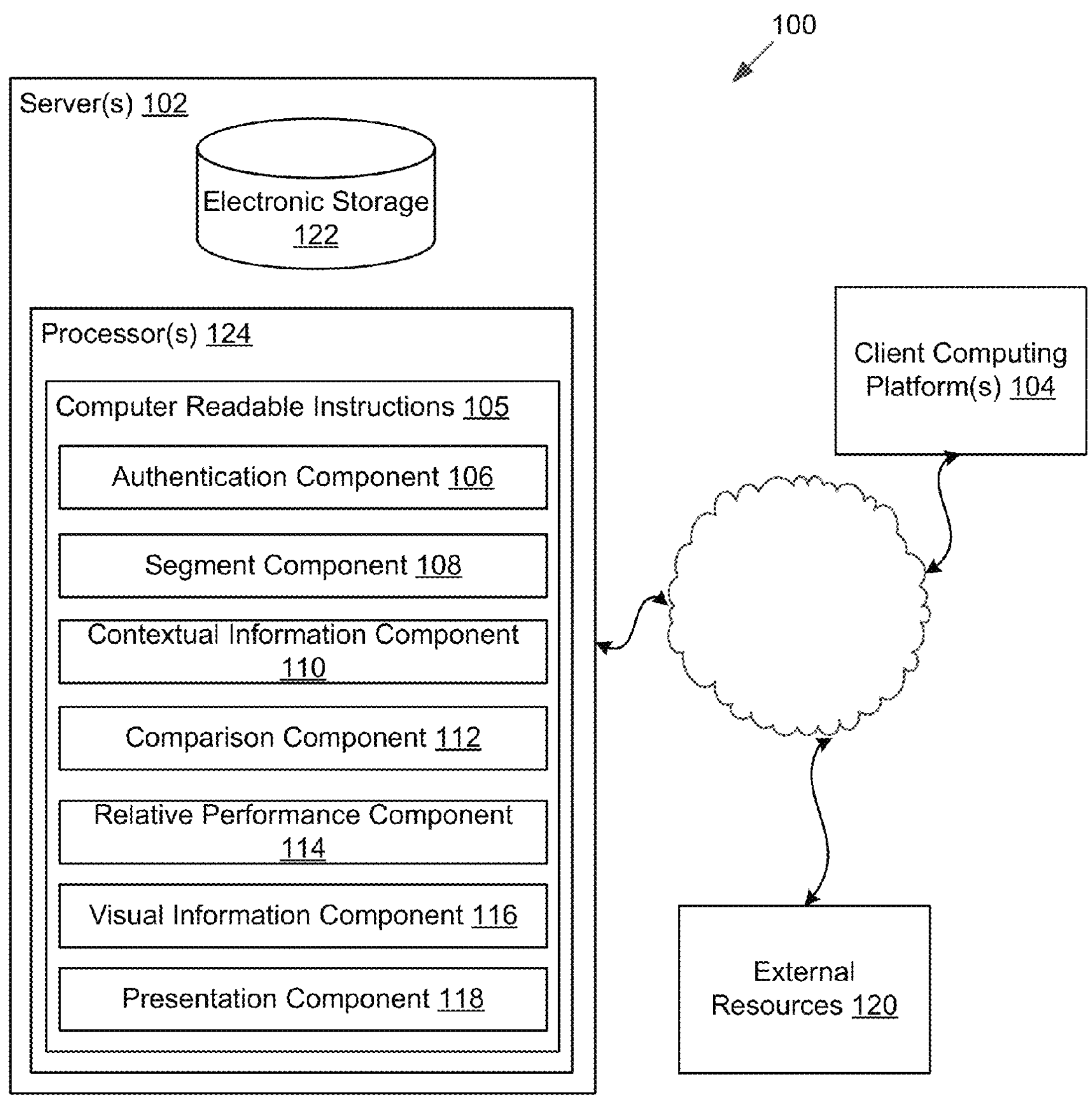
FIG. 1 illustrates a system for presenting visual information during presentation of a video segment, in accordance with one or more implementations.

FIG. 1 illustrates a system 100 for presenting visual information during presentation of a video segment, in accordance with one or more implementations. A video may include one or more activities. Presentation of the video may be augmented with information that compares the captured activity from the video with related activity from the same video or from another video. System 100 may be configured to obtain a first video segment and a second video segment. The first video segment may include a person riding a wave. The second video segment may include the same person riding a different wave or a different person riding the same or different wave. The activity captured within the first video and/or the second video may be associated with contextual information characterizing the activity. Characterizations of the activity may include location, date, time, speed, altitude, and/or other characterizations of the activity. The contextual information associated with the first video segment may be compared with the contextual information associated with the second video segment. The comparison may be presented as visual information during presentation of the first video segment.

As is illustrated in FIG. 1, system 100 may include one or more servers 102. Server(s) 102 may be configured to communicate with one or more client computing platform(s) 104 according to a client/server architecture. The users of system 100 may access system 100 via client computing platform(s) 104. Server(s) 102 may be configured to execute one or more computer program components. The computer program components may include one or more of authentication component 106, segment component 108, contextual information component 110, comparison component 112, relative performance component 114, visual information component 116, presentation component 118, and/or other components.

A repository of images and/or video segments may be available via system 100. The repository of images and/or video segments may be associated with different users. The video segments may include a compilation of videos, video segments, video clips, and/or still images. While the present disclosure may be directed to video and/or video segments, one or more other implementations of system 100 and/or server(s) 102 may be configured for other types of media items. Other types of media items may include one or more of audio files (e.g., music, podcasts, audio books, and/or other audio files), multimedia presentations, photos, slideshows, and/or other media files. The video segments may be received from one or more storage locations associated with client computing platform(s) 104, server(s) 102, and/or other storage locations where video segments may be stored. Client computing platform(s) 104 may include one or more of a cellular telephone, a smartphone, a digital camera, a laptop, a tablet computer, a desktop computer, a television set-top box, a smart TV, a gaming console, and/or other client computing platforms.

Authentication component 106 may be configured to authenticate a user associated with client computing platform 104 accessing one or more images and/or video segments via system 100. Authentication component 106 may be configured to manage accounts associated with users and/or consumers of system 100. The user accounts may include user information associated with users and/or consumers of the user accounts. User information may include information stored by server(s) 102, one or more client computing platform(s) 104, and/or other storage locations.

User information may include one or more of information identifying users and/or consumers (e.g., a username or handle, a number, an identifier, and/or other identifying information), security login information (e.g., a login code or password, a user ID, and/or other information necessary for the user to access server(s) 102), system usage information, external usage information (e.g., usage of one or more applications external to system 100 including one or more of online activities such as in social networks and/or other external applications), subscription information, a computing platform identification associated with the user and/or consumer, a phone number associated with the user and/or consumer, privacy settings information, and/or other information related to users and/or consumers.

Authentication component 106 may be configured to obtain user information via one or more client computing platform(s) 104 (e.g., user input via a user interface, etc.). If a user and/or consumer does not have a preexisting user account associated with system 100, a user and/or consumer may register to receive services provided by server 102 via a website, web-based application, mobile application, and/or user application. Authentication component 106 may be configured to create a user ID and/or other identifying information for a user and/or consumer when the user and/or consumer registers. The user ID and/or other identifying information may be associated with one or more client computing platforms 104 used by the user and/or consumer. Authentication component 106 may be configured to store such association with the user account of the user and/or consumer. A user and/or consumer may associate one or more accounts associated with social network services, messaging services, and the like with an account provided by system 100.

Segment component 108 may be configured to obtain a first video segment. The first video segment may be available within the repository of video segments available via system 100 and/or available on a third party platform, which may be accessible and/or available via system 100. Segment component 108 may be configured to receive a selection of the first video segment from the user. The user may select the first video segment via a user interface associated with system 100 available via one or more client computing platform(s) 104. The first video segment may include a first time duration. The first video segment may be a portion of another video segment having a time duration, such that the first time duration of the first video segment is less than the time duration of the other video segment. For example, if video segment A has a time duration of 11 minutes, the first video segment may be a portion of the 11 minutes. The first video segment may be a 3 minute portion of video segment A.

Segment component 108 may be configured to obtain a second video segment. The second video segment may be available within the repository of video segments available via system 100 and/or available on a third party platform, which may be accessible and/or available via system 100. The second video segment may be associated with and/or captured by the user associated with the first video segment. The second video segment may be associated with and/or captured by a different user than the first video segment. Segment component 108 may be configured to automatically obtain the second video segment based upon contextual information associated with the first video segment and/or the second video segment, as will be discussed in further detail below. Alternatively, segment component 108 may be configured to receive a selection of the second video segment from the user. The user may select the second video segment via a user interface associated with system 100 available via one or more client computing platform(s) 104. The second video segment may include a second time duration. The second video segment may be a portion of another video segment having a time duration, such that the second time duration of the second video segment is less than the time duration of the other video segment. For example, if video segment B has a time duration of 9 minutes, the second video segment may be a portion of the 9 minutes. The second video segment may be a 3 minute portion of video segment B.

The first video segment and/or the second video segment may be video segments captured by the user via one or more client computing platform(s) 104 (e.g., an image capturing device) and/or may be video segments captured by other users. The first video segment and the second video segment may be different video segments captured at different times, dates, places, etc. The first video segment and the second video segment may be different video segment portions with the same or different time durations from the same video segment. If the first video segment and the second video segment are video segments from the same video segment, the first video segment and the second video segment may be different portions and/or overlapping portions of the same video segment. For example, if video segment C has a time duration of 15 minutes, the first video segment and the second video segment may be a portion of the 15 minutes. The first video segment may be a 5 minute portion of video segment C and the second video segment may be a 5 minute portion of video segment C. The first video segment and the second video segment may be different 5 minute portions of video segment C or may be overlapping portions of video segment C. Segment component 108 may obtain any number of video segments.

Contextual information component 110 may be configured to obtain a first set of contextual information associated with the first video segment. The first set of contextual information may include any information pertaining to an environment in which the first video segment and/or portions of the first video segment were captured. The first set of contextual information may include visual and/or audio information based upon the environment in which the first video segment and/or portions of the first video segment were captured. The first set of contextual information may define a first set of performance information characterizing performance of a first activity associated with the first video segment. The first set of contextual information may include one or both of temporal attributes and/or spatial attributes. Temporal attributes may define a time in which the first video segment and/or portions of the first video segment were captured (e.g., date, time, time of year, season, etc.). Spatial attributes may define the environment in which the first video segment and/or portions of the first video segment were captured (e.g., location, landscape, weather, activities, etc.). The temporal attributes and/or spatial attributes may include one or more of a geolocation attribute, a time attribute, a date attribute, and/or a content attribute.

Similarly, contextual information component 110 may be configured to obtain a second set of contextual information associated with the second video segment. The second set of contextual information may include any information pertaining to an environment in which the second video segment and/or portions of the second video segment were captured. The second set of contextual information may include visual and/or audio information based upon the environment in which the second video segment and/or portions of the second video segment were captured. The second set of contextual information may define a second set of performance information characterizing performance of a second activity associated with the second video segment. The second set of contextual information may include one or both of temporal attributes and/or spatial attributes. Temporal attributes may define a time in which the second video segment and/or portions of the second video segment were captured (e.g., date, time, time of year, season, etc.). Spatial attributes may define the environment in which the second video segment and/or portions of the second video segment were captured (e.g., location, landscape, weather, activities, etc.). The temporal attributes and/or spatial attributes may include one or more of a geolocation attribute, a time attribute, a date attribute, and/or a content attribute.

The first set of contextual information and/or the second set of contextual information may be generated from one or more of image analysis of the first video segment, image analysis of the second video segment, a wearable sensor worn by a performer within the first video segment and/or the second video segment, a wearable sensor worn by a user that captured the first video segment and/or the second video segment, one or more sensors carried by an image capturing device that captured the first video segment and/or the second video segment, movement of the image capturing device that captured the first video segment and/or the second video segment, and/or the first set of contextual information and/or the second set of contextual information may be generated in other ways. Movement of the image capturing device may be determined from one or more motion sensors and/or orientation sensors associated with the image capturing device. The one or more motion sensors and/or orientation sensors may include one or more of a global positioning system, an accelerometer, a gyroscope, a magnetometer, an inertial measurement unit, a magnetic position sensor, a radio-frequency position sensor, an altimeter, a distance measurement sensor, and/or other motion sensors and/or orientation sensors.

Contextual information component 110 may be configured to obtain the first set of contextual information associated with capture of the first video segment and/or portions of the first video segment directly from the first video segment, via metadata associated with the first video segment and/or portions of the first video segment, and/or tags associated with the first video segment and/or portions of the first video segment. Contextual information component 110 may be configured to obtain the second set of contextual information associated with capture of the second video segment and/or portions of the second video segment directly from the second video segment, via metadata associated with the second video segment and/or portions of the second video segment, and/or tags associated with the second video segment and/or portions of the second video segment. For example, different portions of the first video segment and/or the second video segment may include different tags and/or may be associated with different metadata. As will be discussed in further detail below, the metadata may include a location where the first video segment and/or the second video segment were captured, a time at which the first video segment and/or the second video segment were captured, a speed at which the performer was performing an activity captured within the first video segment and/or the second video segment, a speed at which the image capturing device was moving while capturing the first video segment and/or the second video segment, an altitude at which the performer was performing an activity captured within the first video segment and/or the second video segment, an altitude at which the image capturing device was hovering while capturing the first video segment and/or the second video segment, biometric data associated with the first video segment and/o the second video segment, a gyro position of the image capturing device while capturing the first video segment and/or the second video segment, telemetry associated with the first video segment and/or the second video segment received by the image capturing device and/or system 100, and/or other metadata.

A geolocation attribute may include a physical location of where the video segments (e.g., the first video segment and/or the second video segment) and/or portions of the video segments were captured. The geolocation attribute may correspond to one or more of a compass heading, one or more physical locations of where the video segments and/or portions of the video segments were captured, a pressure at the one or more physical locations, a depth at the one or more physical locations, a temperature at the one or more physical locations, and/or other information. The geolocation attribute may be determined based upon one or more of geo-stamping, geotagging, user entry and/or selection, output from one or more sensors (external to and/or internal to the image capturing device), and/or other techniques. Examples of the geolocation attribute may include the name of a country, region, city, a zip code, a longitude and/or latitude, and/or other information relating to a physical location where the video segments and/or portions of the video segments were captured. A single video segment may include more than one geolocation attribute based upon different portions of the video segment being captured in different locations. For example, the image capturing device may be in motion, and thus a single video segment may include different locations based upon where the image capturing device began capturing the video segment and where the image capturing device stopped capturing the video segment. The user may provide geolocation attributes based on user entry and/or selection of geolocations prior to, during, and/or post capture of the video segments.

A time attribute may correspond to a one or more timestamps associated with when the video segments and/or portions of the video segments were captured. Examples of the time attribute may include a time local to the physical location (which may be based upon the geolocation attribute) of when the video segments and/or portions of the video segments were captured, the time zone associated with the physical location, and/or other information relating to a time when the video segments and/or portions of the video segments were captured. A single video segment may include more than one time attribute based upon different portions of the video segment being captured at different times and/or different locations. For example, a single video segment may span hours of continuous recording, such that different timestamps may be associated with different portions of the video segment. The time attribute may be determined based upon timestamping and/or other techniques. For example, the image capturing device may include an internal clock that may be configured to timestamp the video segment prior to, during, and/or post capture of the video segment (e.g., the image capturing device may timestamp the video segment at 1 PM PST). In some implementations, the user may provide the time attribute based upon user entry and/or selection of timestamps prior to, during, and/or post capture of the video segment.

A date attribute may correspond to a one or more of a date associated with when the video segments and/or portions of the video segments were captured, seasonal information associated with when the video segments and/or portions of the video segments were captured, and/or a time of year associated with when the video segments and/or portions of the video segments were captured. The date attribute may be determined based upon date stamping and/or other techniques. For example, the image capturing device may include an internal clock and/or calendar that may be configured to date stamp the video segment prior to, during, and/or post capture of the video segment. In some implementations, the user may provide the date attribute based upon user entry and/or selection of date stamps prior to, during, and/or post capture of the video segment. Seasonal information may be based upon the geolocation attribute (e.g., different hemispheres experience different seasons based upon the time of year).

A content attribute may correspond to one or more of an action depicted within the video segments and/or portions of the video segments, one or more objects depicted within the video segments and/or portions of the video segments, and/or a landscape depicted within the video segments and/or portions of the video segments. For example, the content attribute may include a particular action (e.g., running), object (e.g., a building), and/or landscape (e.g., beach) portrayed and/or depicted in the video segments. One or more of an action depicted within the video segments and/or portions of the video segments may include one or more of sport related actions, inactions, motions of an object, and/or other actions. One or more of an object depicted within the video segments and/or portions of the video segments may include one or more of a static object (e.g., a building), a moving object (e.g., a moving train), a particular actor (e.g., a body), a particular face, and/or other objects. A landscape depicted within the video segments and/or portions of the video segments may include scenery such as a desert, a beach, a concert venue, a sports arena, etc. Content of the video segments and/or portions of the video segments may be determined based upon object detection of content included within the video segments and/or portions of the video segments. The content attribute associated with the first video segment and/or the second video segment may define the first set of performance information and/or the second set of performance information.

The content attribute may be determined based upon one or more action, object, landscape, and/or composition detection techniques. Such techniques may include one or more of SURF, SIFT, bounding box parameterization, facial recognition, visual interest analysis, composition analysis (e.g., corresponding to photography standards such as rule of thirds and/or other photography standards), audio segmentation, visual similarity, scene change, motion tracking, and/or other techniques. In some implementations content detection may facilitate determining one or more of actions, objects, landscapes, composition, and/or other information depicted in the current video segment. Composition may correspond to information determined from composition analysis and/or other techniques. For example, information determined from composition analysis may convey occurrences of photography standards such as the rule of thirds, and/or other photograph standards. In another example, a sport related action may include surfing. The action of surfing may be detected based upon one or more objects that convey the act of surfing. Object detections that may convey the action of surfing may include one or more of a wave shaped object, a human shaped object standing on a surfboard shaped object, and/or other objects.

Comparison component 112 may be configured to compare the first set of performance information and the second set of performance information. As described above, the first set of contextual information obtained by contextual information component 110 may define a first set of performance information characterizing performance of the first activity associated with the first video segment. The second set of contextual information obtained by contextual information component 110 may define a second set of performance information characterizing performance of the second activity associated with the second video segment. For example, comparison component 112 may be configured to compare the first set of performance information and the second set of performance information to determine that an action depicted within both the first video segment and the second video segment includes surfing.

Relative performance component 114 may be configured to determine relative performance of the first activity relative to the second activity based upon the comparison by comparison component 112. Based upon commonalities between the first set of performance information and the second set of performance information, relative comparison component 114 may be configured to determine differences between the first set of performance information and the second set of performance information. For example, comparison component 112 may have compared the first activity and the second activity to determine that both include surfing. Relative performance component 114 may be configured to determine that the first video segment includes Lisa riding a wave at La Jolla Shores Beach on Sep. 15, 2015 at 3 PM and that the second video segment includes Lisa riding a wave at La Jolla Shores Beach on Sep. 15, 2016 at 2:30 PM. Relative performance component 114 may be configured to determine the relative performance of the first activity relative to the second activity based upon the comparison to include that at 3 PM on Sep. 15, 2015, Lisa rode the wave at a particular speed, while on Sep. 15, 2016 at 2:30 PM, Lisa rode the wave at a slightly faster speed. This is for exemplary purposes only, as relative performance component 114 may be configured to determine relative performance of the first activity relative to the second activity based upon any number of factors. For example, the second video segment may include Lisa riding the wave at a different location. The second video segment may include a different surfer, such that relative performance component 114 may be configured to determine relative performance of Lisa relative to the different surfer, either on the same date/location or on another date/location.

Relative performance component 114 may be configured to tag a point in time within the first video segment and/or the second video segment at which a comparison was made. For example, a point of comparison within the first video segment may have been at 2 minutes and 30 seconds within the time duration of the first video segment, while the point of comparison within the second video segment may have been at 1 minute and 10 seconds within the time duration of the second video segment. Relative performance component 114 may be configured to tag the first video segment at 2 minutes and 30 seconds to indicate that the comparison was made with contextual information associated with that moment within the first video segment. Relative performance component 114 may be configured to tag the second video segment at 1 minute and 10 seconds to indicate that the comparison was made with contextual information associated with that moment within the second video segment.

Visual information component 116 may be configured to generate visual information associated with the first video segment. The visual information may include the relative performance determined by relative performance component 114. The visual information may include helpful information to inform the user of differences and/or similarities between the first video segment and the second video segment. The visual information may include text describing the comparison between the first set of contextual information and the second set of contextual information. The visual information may include a graphic. The visual information may include an image from the second video segment. The visual information may include a portion of and/or the entire time duration of the second video segment.

The visual information may include text describing the comparison between the first set of contextual information and the second set of contextual information. Referring to the example above, visual information component 116 may be configured to generate text describing how much faster Lisa rode the wave on Sep. 15, 2016 at 2:30 PM than Sep. 15, 2015 at 3 PM. For example, the text describing the comparison may include "You rode the wave 1 mile per hour faster at La Jolla Shores Beach on Sep. 15, 2016 at 2:30 PM than Sep. 15, 2015 at 3 PM. It was slightly overcast on Sep. 15, 2016 and it was clear skies on Sep. 15, 2015."

The visual information may include a graphic. For example, the visual information may include a speedometer that represents the speed at which the image capturing device was traveling while capturing the first video segment and/or the second video segment and/or the speed at which the performer captured within the first video segment and/or the second video segment was traveling while performing the activity. Referring to the example above, the visual information may include a first speedometer graphically displaying the speed at which Lisa is riding the wave in the first video segment and/or a second speedometer graphically displaying the speed at which Lisa is riding the wave in the second video segment.

The visual information may include an image from the second video segment. Visual information component 116 may be configured to obtain a still frame from the second video segment at or near the point in time tagged by relative performance component 114 at which the comparison was made. Referring to the example above, visual information component 116 may be configured to obtain a still frame from the second video segment at or near 1 minute and 10 seconds.

Presentation component 118 may be configured to effectuate presentation of the visual information during presentation of the first video segment. The visual information may be presented during presentation of the first video segment at or near the tagged point in time within the time duration of the first video segment. The visual information may be presented during presentation of the first video segment throughout the entire time duration of the first video segment.

The visual information may be presented side-by-side within a display associated with client computing platform(s) 104 during presentation of the first video segment. For example, if the visual information includes a portion of and/or the entire time duration of the second video segment, a split screen within the display associated with client computing platform(s) 104 may allow for presentation of the first video segment on one side of the split screen and simultaneous presentation of the second video segment on the opposite side of the split screen from the first video segment. If the visual information includes a still frame and/or image from the second video segment, presentation component 118 may be configured to effectuate presentation of the still frame and/or image from the second video segment on the opposite side of the split screen during presentation of the first video segment. In a similar manner, presentation component 118 may be configured to effectuate presentation of text describing the comparison on the opposite side of the split screen during presentation of the first video segment.

The visual information may be presented as an overlay within a display associated with client computing platform(s) 104 during presentation of the first video segment. For example, presentation component 118 may be configured to effectuate presentation of the text describing the comparison as an overlay during presentation of the first video segment. Presentation component 118 may be configured to effectuate presentation of the image from the second video segment as an overlay during presentation of the first video segment.

Figure 2:
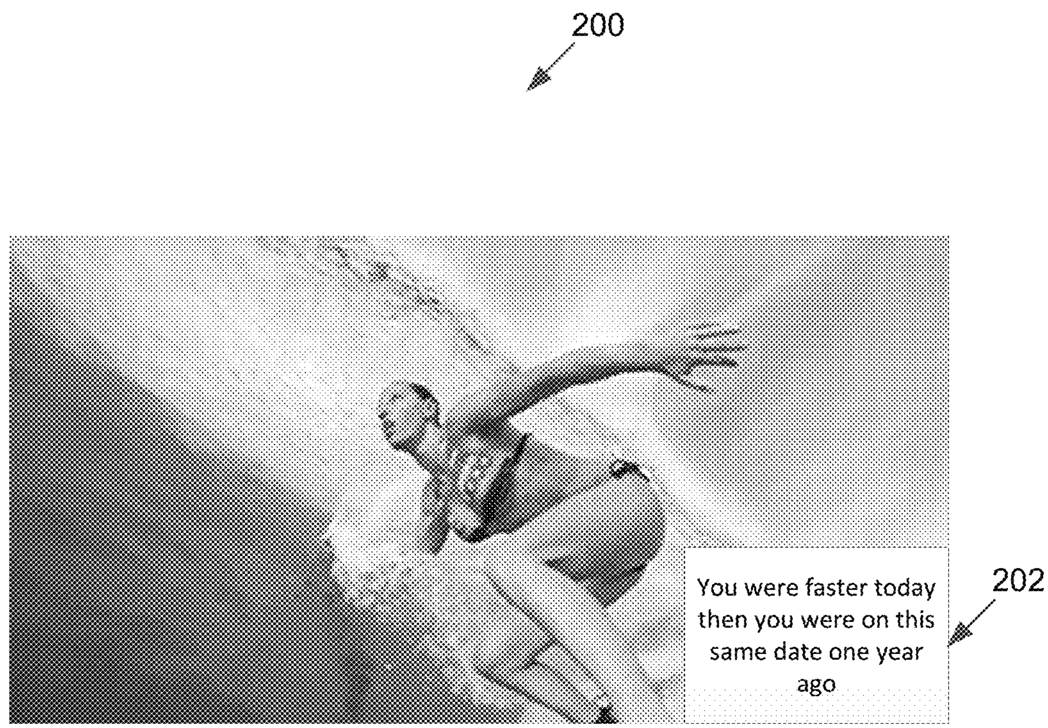
FIG. 2 illustrates visual information presented during presentation of a video segment, in accordance with one or more implementations.

For example and referring to FIG. 2, video segment 200 may be presented within a display (not shown) associated with client computing platform(s) 104. As shown in FIG. 2, the visual information may include text box 202. Text box 202 may be presented within video segment 200 as an overlay during presentation of video segment 200 within the display (not shown) associated with client computing platform(s) 104. Text box 202 may be presented as an overlay during presentation of video segment 200 for the entire time duration of video segment 200 or may be presented at or near a tagged point in time at which the comparison was made relative to a second video segment (not shown).

Figure 3:
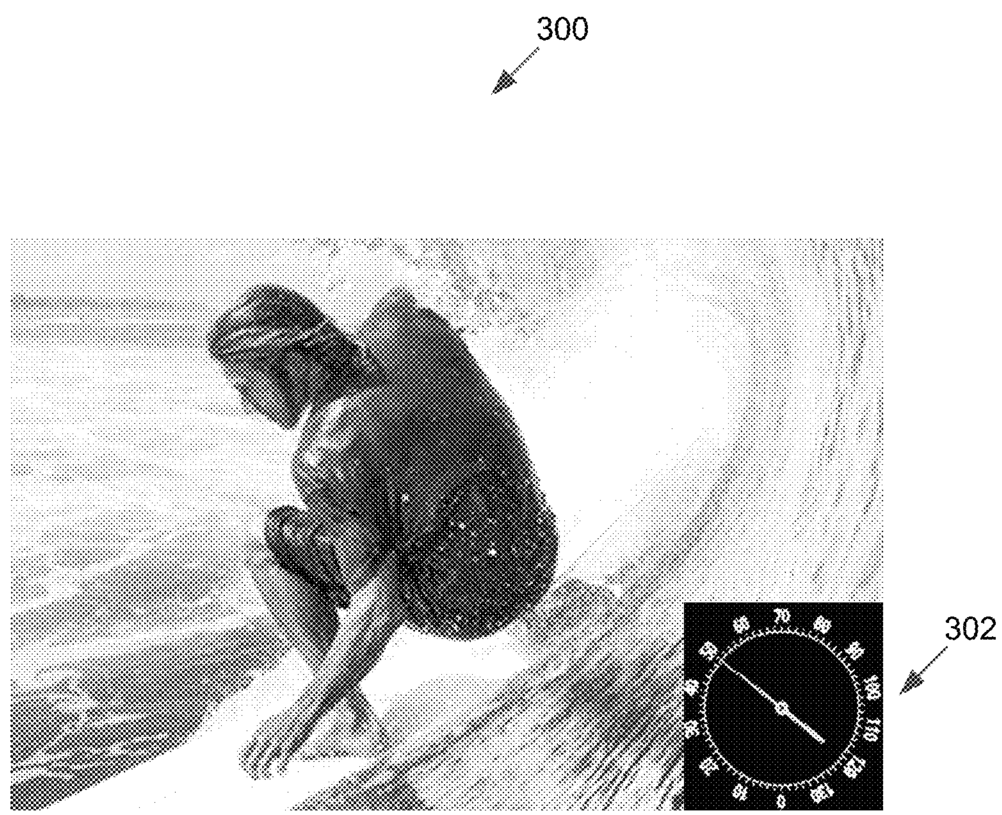
FIG. 3 illustrates visual information presented during presentation of a video segment, in accordance with one or more implementations.

Referring to FIG. 3, video segment 300 may be presented within a display (not shown) associated with client computing platform(s) 104. As shown in FIG. 3, the visual information may include a graphic of speedometer 302. Speedometer 302 may be presented within video segment 300 as an overlay during presentation of video segment 300 within the display (not shown) associated with client computing platform(s) 104. Speedometer 302 may be presented as an overlay during presentation of video segment 300 for the entire time duration of video segment 300 or may be presented during times at which the surfer is surfing within video segment 300. Speedometer 300 may reflect a speed at which the surfer is surfing within video segment 300 and may fluctuate based upon the change of speed of the surfer during presentation of video segment 300.

Figure 4:
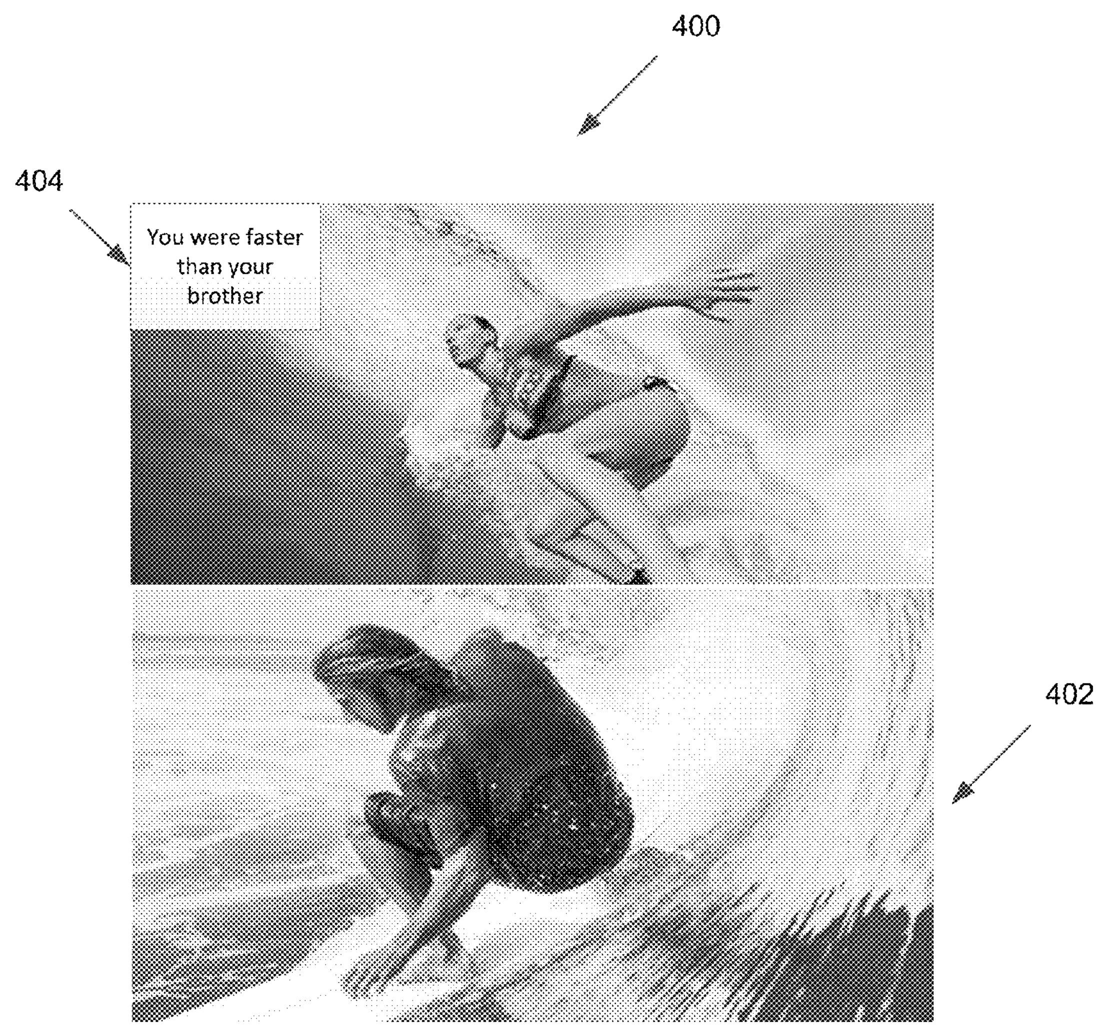
FIG. 4 illustrates visual information presented during presentation of a video segment, in accordance with one or more implementations.

Referring to FIGS. 1 and 4, first video segment 400 and second video segment 402 may be presented within a display (not shown) associated with client computing platform(s) 104. As shown in FIG. 4, the visual information may include second video segment 402. Second video segment 402 may be presented during presentation of first video segment 400 in a split screen fashion such that the user may consume first video segment 400 and second video segment 402 simultaneously. System 100 may be configured to generate and/or present visual information including relative performance of the activity (e.g., surfing) within first video segment 400 and the activity (e.g., surfing) within second video segment 402. For example, text box 404 may be presented that indicates that the surfer in first video segment 400 was faster than the surfer in second video segment 402.

Presentation component 118 may be configured to pause presentation of the first video segment. Presentation component 118 may be configured to pause presentation of the first video segment at or near the tagged point in time at which the comparison was made. Presentation component 118 may be configured to present the visual information while presentation of the first video segment is paused. Presentation component 118 may be configured to resume presentation of the first video segment upon completion of the presentation of the visual information. For example, if the visual information includes a portion of and/or the entire length of the second video segment, presentation component 118 may be configured to pause presentation of the first video segment in order to present the second video segment, either in the same portion of the display as the first video segment or a different portion of the display as the first video segment. Upon completion of presentation of the second video segment (e.g., at the end of the time duration of the second video segment or a user input indicating the user does not wish to consume the visual information), presentation component 118 may be configured to resume presentation of the first video segment.

More than one comparison may be made between the first video segment and the second video segment. The multiple comparisons may be presented via visual presentation throughout various points and times during presentation of the first video segment. The first set of performance information associated with the first video segment may be compared with any number of sets of performance information from any number of video segments. For example, if the user is on vacation, system 100 may be configured to compare multiple video segments captured during the vacation (e.g., captured in Bali) to determine a point in time during a particular video segment where the user rode a wave the fastest during the vacation.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114, 116, 118, and/or other components. The processor(s) 124 may be configured to execute components 106, 108, 110, 112, 114, 116, 118, and/or other components by software; hardware; firmware; some combination of software, hardware, and/or firmware; and/or other mechanisms for configuring processing capabilities on processor(s) 124.

It should be appreciated that although components 106, 108, 110, 112, 114, 116, and 118 are illustrated in FIG. 1 as being co-located within a single processing unit, in implementations in which processor(s) 124 includes multiple processing units, one or more of components 106, 108, 110, 112, 114, 116, and/or 118 may be located remotely from the other components. The description of the functionality provided by the different components 106, 108, 110, 112, 114, 116, and/or 118 described herein is for illustrative purposes, and is not intended to be limiting, as any of components 106, 108, 110, 112, 114, 116, and/or 118 may provide more or less functionality than is described. For example, one or more of components 106, 108, 110, 112, 114, 116, and/or 118 may be eliminated, and some or all of its functionality may be provided by other ones of components 106, 108, 110, 112, 114, 116, and/or 118. As another example, processor(s) 124 may be configured to execute one or more additional components that may perform some or all of the functionality attributed herein to one of components 106, 108, 110, 112, 114, 116, and/or 118.

Figure 5:
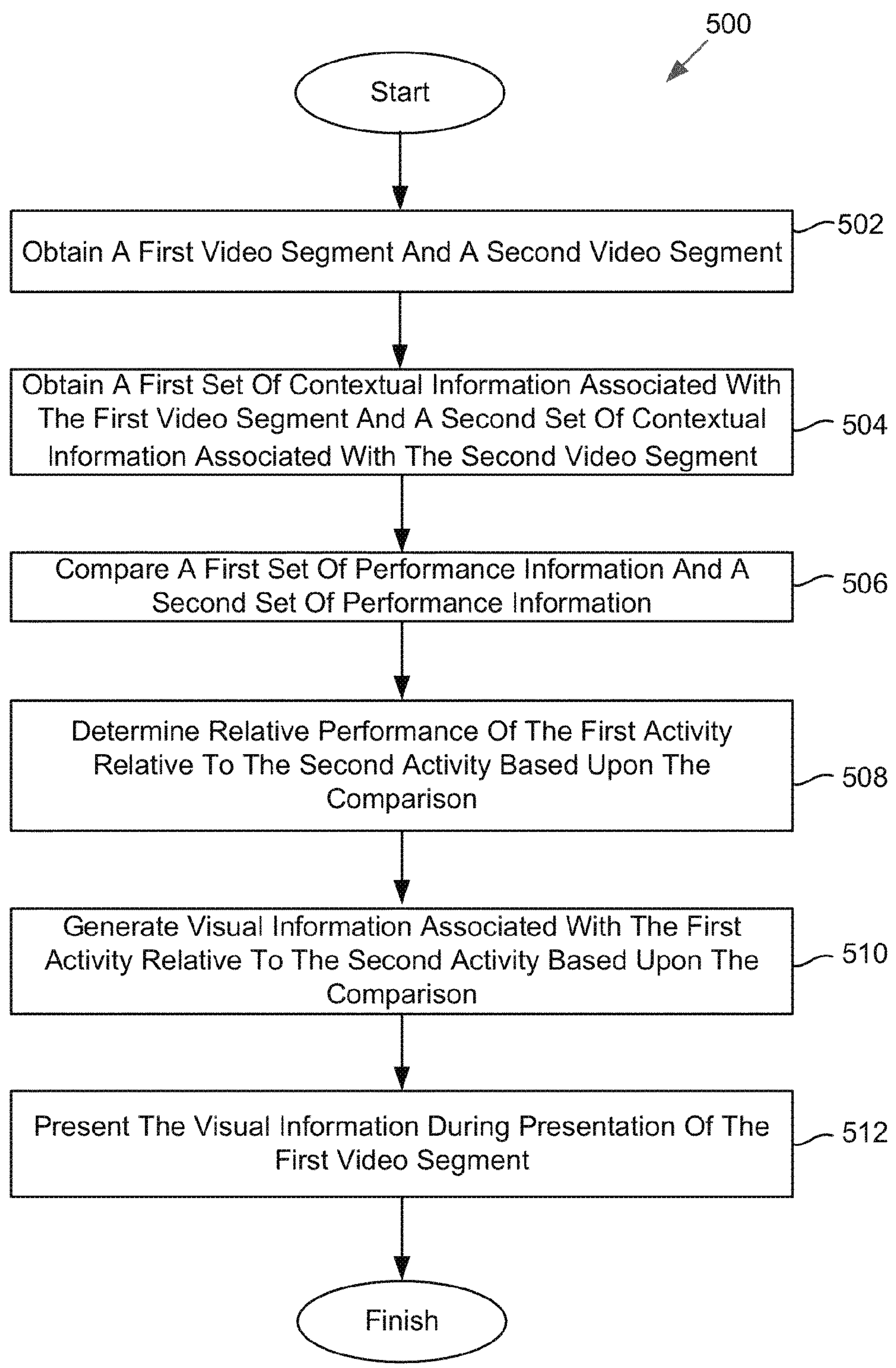
FIG. 5 illustrates a method for presenting visual information during presentation of a video segment, in accordance with one or more implementations.

FIG. 5 illustrates a method 500 for presenting visual information during presentation of a video segment, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, a first video segment and a second video segment may be obtained. Operation 502 may be performed by a segment component that is the same as or similar to segment component 108, in accordance with one or more implementations.

At an operation 504, a first set of contextual information associated with the first video segment and a second set of contextual information associated with the second video segment may be obtained. The first set of contextual information may define a first set of performance information characterizing performance of a first activity associated with the first video segment. The second set of contextual information may define a second set of performance information characterizing performance of a second activity associated with the second video segment. Operation 504 may be performed by a contextual information component that is the same as or similar to contextual information component 110, in accordance with one or more implementations.

At an operation 506, the first set of performance information and the second set of performance information may be compared. Operation 506 may be performed by a comparison component that is the same as or similar to comparison component 112, in accordance with one or more implementations.

At an operation 508, relative performance of the first activity to the second activity may be determined based upon the comparison. Operation 508 may be performed by a relative performance component that is the same as or similar to relative performance component 114, in accordance with one or more implementations.

At an operation 510, visual information associated with the first video segment may be generated. The visual information may include the relative performance. Operation 510 may be performed by a visual information component that is the same as or similar to visual information component 116, in accordance with one or more implementations.

At an operation 512, the visual information may be presented during presentation of the first video segment. Operation 512 may be performed by a presentation component that is the same as or similar to presentation component 118, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting visual information during presentation of a video segment, the system comprising:

one or more physical computer processors configured by computer readable instructions to:

obtain a first video segment;

obtain a second video segment;

obtain a first set of contextual information associated with the first video segment, the first set of contextual information defining a first set of performance information characterizing performance of a first activity associated with the first video segment;

obtain a second set of contextual information associated with the second video segment, the second set of contextual information defining a second set of performance information characterizing performance of a second activity associated with the second video segment;

compare the first set of performance information and the second set of performance information;

determine relative performance of the first activity relative to the second activity based upon the comparison;

generate visual information associated with the first video segment, the visual information including the relative performance; and present the visual information during presentation of the first video segment.

2. The system of claim 1, wherein the first set of contextual information and/or the second set of contextual information may be generated from one or more of image analysis of the first video segment, image analysis of the second video segment, a wearable sensor, one or more sensors carried by an image capturing device that captured the first video segment and/or the second video segment, and/or movement of the image capturing device that captured the first video segment and/or the second video segment.

3. The system of claim 1, wherein the first set of contextual information and/or the second set of contextual information includes one or both of temporal attributes and/or spatial attributes.

4. The system of claim 3, wherein the one or more temporal attributes and/or spatial attributes include one or more of a geolocation attribute, a time attribute, a date attribute, and/or a content attribute.

5. The system of claim 4, wherein the content attribute includes one or more of an action depicted within the visual information, one or more objects depicted within the visual information, and/or a landscape depicted within the visual information.

6. The system of claim 1, wherein the visual information includes text describing the comparison between the first set of contextual information and the second set of contextual information.

7. The system of claim 1, wherein the visual information includes an image from the second video segment.

8. The system of claim 1, wherein the visual information is presented side-by-side within a display during presentation of the first video segment.

9. The system of claim 1, wherein the visual information is presented as an overlay within a display during presentation of the first video segment.

10. The system of claim 1, wherein the one or more physical computer processors are configured by computer readable instructions to:

pause presentation of the first video segment;

present the visual information while presentation of the first video segment is paused; and upon completion of the presentation of the visual information, resume presentation of the first video segment.

11. A method for presenting visual information during presentation of a video segment, the method comprising:

obtaining a first video segment;

obtaining a second video segment;

obtaining a first set of contextual information associated with the first video segment, the first set of contextual information defining a first set of performance information characterizing performance of a first activity associated with the first video segment;

obtaining a second set of contextual information associated with the second video segment, the second set of contextual information defining a second set of performance information characterizing performance of a second activity associated with the second video segment;

comparing the first set of performance information and the second set of performance information;

determining relative performance of the first activity relative to the second activity based upon the comparison;

generating visual information associated with the first video segment, the visual information including the relative performance; and presenting the visual information during presentation of the first video segment.

12. The method of claim 11, wherein the first set of contextual information and/or the second set of contextual information may be generated from one or more of image analysis of the first video segment, image analysis of the second video segment, a wearable sensor, one or more sensors carried by an image capturing device that captured the first video segment and/or the second video segment, and/or movement of the image capturing device that captured the first video segment and/or the second video segment.

13. The method of claim 11, wherein the first set of contextual information and/or the second set of contextual information includes one or both of temporal attributes and/or spatial attributes.

14. The method of claim 13, wherein the one or more temporal attributes and/or spatial attributes include one or more of a geolocation attribute, a time attribute, a date attribute, and/or a content attribute.

15. The method of claim 14, wherein the content attribute includes one or more of an action depicted within the visual information, one or more objects depicted within the visual information, and/or a landscape depicted within the visual information.

16. The method of claim 11, wherein the visual information includes text describing the comparison between the first set of contextual information and the second set of contextual information.

17. The method of claim 11, wherein the visual information includes an image from the second video segment.

18. The method of claim 11, wherein the visual information is presented side-by-side within a display during presentation of the first video segment.

19. The method of claim 11, wherein the visual information is presented as an overlay within a display during presentation of the first video segment.

20. The method of claim 11, further comprising:

pausing presentation of the first video segment;

presenting the visual information while presentation of the first video segment is paused; and upon completion of the presentation of the visual information, resuming presentation of the first video segment.

* * * * *